Feb. 4, 1958 L. PERAS 2,821,839
HYDRAULIC TORQUE CONVERTERS
Filed April 12, 1955 2 Sheets-Sheet 1

United States Patent Office 2,821,839
Patented Feb. 4, 1958

2,821,839

HYDRAULIC TORQUE CONVERTERS

Lucien Péras, Billancourt, France, assignor to Regie Nationale des Usines Renault, Billancourt, France Application April 12, 1955, Serial No. 500,977

Claims priority, application France April 24, 1954

2 Claims. (Cl. 60—54)

The invention relates to the shape of blading in hydraulic torque converters.

In a hydraulic torque converter, the driving shaft and the driven shaft are connected by means of a fluid of which the movements are determined by the blades of a "pump" or impeller fixed to the driving shaft, by the blades of a "turbine" connected to the driven shaft, and by the blades of a "reactor" carried by the fixed housing of the converter by a unidirectional coupling. This latter thus allows the reactor to turn freely in the direction of rotation of the driving shaft and holds it stationary in the reverse direction.

When the reactor is placed in the central part of the circuit closest to the principal axis of rotation of the converter, which is usually done for ease of construction, the direction of arrival of the fluid jets varies considerably. In fact, the fluid jets leaving the turbine have a large component of rearward rotation when the driven shaft starts, that is to say in the opposite direction to the rotation of the driving shaft. These fluid jets then have to be corrected by the reactor, which has to give them a considerable component of forward rotational speed. On the other hand, when the driven shaft turns under the influence of the torque transmitted to it by the turbine, the direction of the fluid jets at the entry of the reactor, which was previously strongly directed rearward, is corrected and is even directed forward as the speed of rotation of the turbine increases. During the whole of this phase of operation, the angle of entry of the reactor blades and the deviation which they give to the fluid jets should consequently vary.

Finally, at high rotational speeds of the turbine, the reactor is driven forward, due to the existence of the unidirectional coupling, without absorbing the torque. The reactor blades must then assume the direction of the fluid jets leaving the turbine, and cause as little turbulence as possible to the flow of these jets.

Since these different conditions of operation impose conflicting requirements for the path of the reactor blades, it has been proposed to make the blading of the latter adjustable. The construction of such blading is, however, complicated, and the automatic variation of orientation necessitates delicate adjustment. It is consequently usual for makers to work out the path of these blades for an intermediate range of operation.

The invention has for its object a reactor blading path allowing the reactor to be adapted to the different conditions of operation of the converter. Use is made of the fact that the fluid circulating in the device is subjected to a centrifugal force which increases with the speed of rotation of the turbine, the active jets taking up a greater distance from the axis of rotation the faster the driven shaft rotates.

In accordance with the invention, the reactor blading path is such that the angle of entry of the blades varies in proportion to the increase in radial distance from the axis of rotation, the entries of the blades occurring conveniently in relation to the active jets for the whole range of operation of the turbine. The angle of exit of these blades is, on the other hand, constant over their whole height.

An embodiment of a hydraulic torque converter having a reactor improved in accordance with the invention will now be described by way of non-limitative example and with reference to the attached drawing, wherein.

Figure 1:
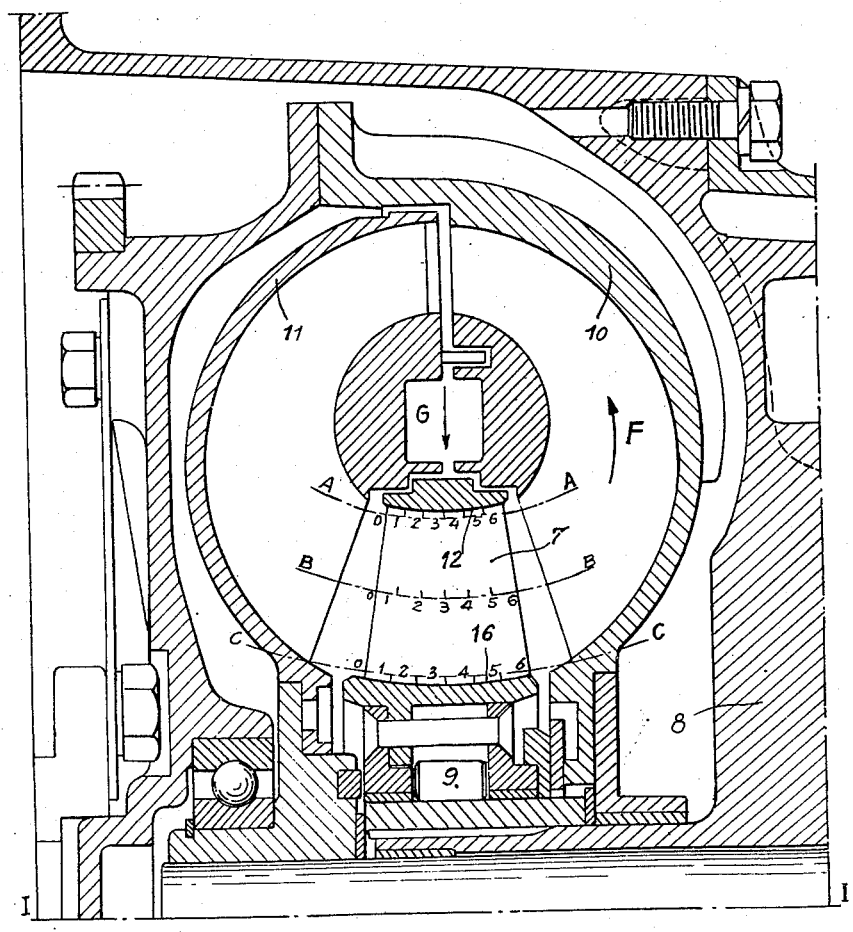
Fig. 1 is a half-section of the converter taken on a plane through the axis of rotation.

Different areas, numbered 0 to 6, of the blading of the reactor 7 are shown in Fig. 1, which also shows that this reactor is carried by the housing 8 of the converter by means of a unidirectional coupling 9. The pump element is shown in diagrammatic form at 10, and the turbine element at 11.

Figure 2:
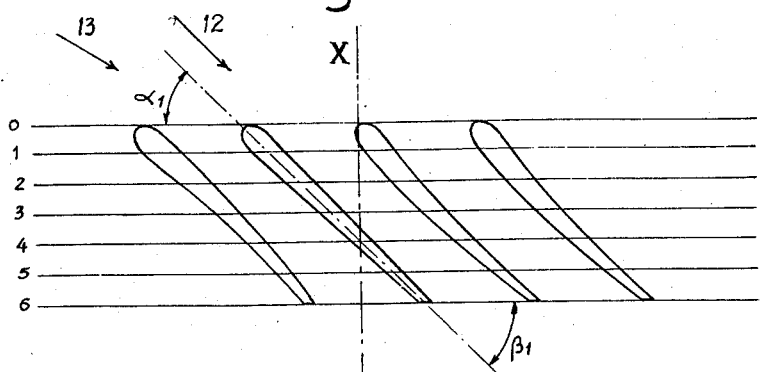
Fig. 2 is a developed illustration of the blade cross-sections of the reactor on line A—A and as seen from above.

The cross sectional configuration of the blades adjacent surface 12 of the reactor taken on line A—A is developed in Fig. 2, which shows four of the reactor blades. In accordance with the invention, the angle $\alpha_1$ of entry of the blades is at this part of the circuit, which is farthest from the axis of rotation I—I, substantially equal to the angle of exit $\beta_1$. The cross sectional outline of the blades on this line is substantially rectangular, which favours the flow of the fluid in the direction of the arrow 12 at high rotational speeds of the turbine. The blading then adapts itself to the direction of arrival of the fluid by free rotation of the reactor. Whenever the direction of inflow of the fluid leaving the turbine 11 is at a greater angle relative the reactor blades such as shown by arrow 13 (Fig. 2), the blades will tend to align themselves with the fluid streams by virtue of the free rotation of wheel 7 in the direction of rotation of the driven shaft. This alignment in combination with the rectangular configuration of the blades reduces turbulence, shock, and drag at high turbine speeds.

Figure 3:
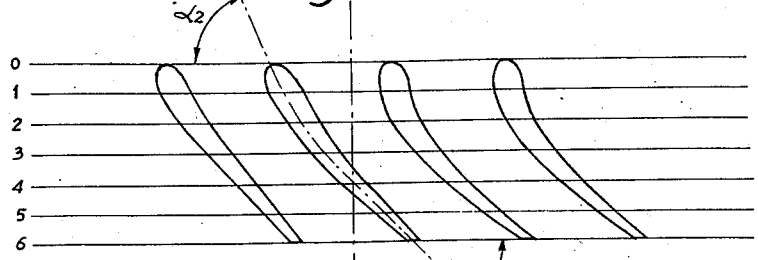
Fig. 3 is a developed illustration of the blade cross-sections of the reactor taken on the line B—B as seen from above.

Figure 3 develops the blade cross sections along line B—B. On this surface the inlet angle $\alpha_2$ is greater than the inlet angle $\alpha_1$ and the outlet angle $\beta_2$ is equal to the angle $\beta_1$ of Fig. 2. Accordingly, inlet angle $\alpha_2$ is considerably greater than outlet $\beta_2$. The camber of the blades is greater along line B—B than on line A—A. (Figs. 2 and 3.)

Figure 4:
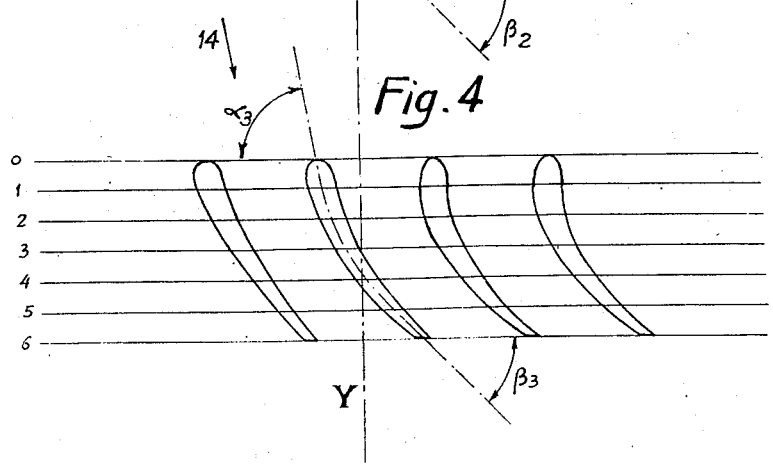
Fig. 4 is a cross sectional view of the reactor blades taken on line C—C.

The cross sectional area of the blades adjacent surface 16 of the reactor on line C—C is developed in Fig. 4, which shows the same four reactor blades of Figs. 2 and 3. In accordance with the invention, the angle of exit $\beta_3$ is equal to the angles of exit $\beta_1$ and $\beta_2$. The angle of entry $\alpha_3$ is, on the other hand, greater than the inlet angle $\alpha_2$ of Fig. 3. The blades have a greater camber along this line than is the case along line B—B. (Figs. 3 and 4.) The discharge flow of fluid from the turbine at low speeds is such that it flows a flow path relative to the blade profiles in the manner represented by arrow 14 and the inlet angle is accordingly adapted to this flow path. Blade profiles which are nearest to the axis of rotation I—I, are thus favourable to the condition under which the fluid arrives at low speeds of rotation, the fluid jets being nevertheless corrected on leaving the blading in accordance with the angle $\beta_3$.

The blades thus provide flow path conditions varying with radial distance from the axis of rotation, the angle of exit of the blades being constant whatever this distance, the blades having a greater angular displacement relative their vertical axis the nearer they approach the axis of rotation.

By way of an example of an embodiment, the values of entry and exit angles of reactor blading according to the invention may be as follows:

Angle of entry $a_1 = 40°$
Angle of entry $a_2 = 60°$
Angle of entry $a_3 = 80°$
Constant angles of exit $\beta_1, \beta_2, \beta_3 = 20°$.

I claim:

1. A hydraulic torque converter comprising a pump having blades, a turbine having blades, and a reaction member rotationally mounted on a uni-directional coupling arranged to form a close toroidal fluid circuit in which pump blade exits and turbine blade entrances are at the largest circuit radius relative to a main rotational axis of the converter, said reaction member being disposed between the pump and turbine at the shortest circuit radius relative said axis, a plurality of airfoil-shaped blades in said reaction member, each of said reaction blades having angles of entrance and outlet, each of said reaction blades changing in curvature gradually along the chord and span, whereby blade profile portions radially nearest the axis of rotation have a larger angle of entry than those farthest away from said axis, and said outlet angles remain substantially constant throughout the span of the blades.

2. A hydraulic torque converter in accordance with claim 1 in which said reaction blades have entrance angles of the order of 80° in the blade portions nearest the axis of rotation and entrance angles of the order of 40° on the blade portions farthest removed from said axis, the curvature of the blades changing gradually and progressively at intermediate points.

References Cited in the file of this patent
UNITED STATES PATENTS

| | | |
|---|---|---|
| 2,224,519 | McIntyre | Dec. 10, 1940 |
| 2,410,185 | Schneider et al. | Oct. 29, 1946 |
| 2,524,869 | Adamtchik | Oct. 10, 1950 |
| 2,585,851 | Salerni | Feb. 12, 1952 |